United States Patent
Greci et al.

(10) Patent No.: US 11,614,756 B2
(45) Date of Patent: Mar. 28, 2023

(54) FLOW RATE MANAGEMENT FOR IMPROVED RECOVERY

(71) Applicant: Halliburton Energy Services, Inc., Houston, TX (US)

(72) Inventors: Stephen Michael Greci, Little Elm, TX (US); Michael Linley Fripp, Carrollton, TX (US); Richard Decena Ornelaz, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 312 days.

(21) Appl. No.: 16/478,474

(22) PCT Filed: Nov. 30, 2018

(86) PCT No.: PCT/US2018/063379
§ 371 (c)(1),
(2) Date: Jul. 16, 2019

(87) PCT Pub. No.: WO2020/112141
PCT Pub. Date: Jun. 4, 2020

(65) Prior Publication Data
US 2021/0333809 A1    Oct. 28, 2021

(51) Int. Cl.
*G05B 13/02*    (2006.01)
*G05D 7/06*    (2006.01)

(52) U.S. Cl.
CPC ....... *G05D 7/0635* (2013.01); *G05B 13/0265* (2013.01)

(58) Field of Classification Search
CPC .......................... G05D 7/0635; G05B 13/0265
(Continued)

(56) References Cited

U.S. PATENT DOCUMENTS 7,805,248 B2 *   9/2010   Thigpen ................. E21B 43/32
                                                                       702/6
8,709,817 B2 *   4/2014   Durack ................ A01N 1/0284
                                                                       436/63
(Continued)

FOREIGN PATENT DOCUMENTS

GB      WO 2017/174750    * 10/2017
WO    WO-2017058258 A1 *   4/2017 ............. E21B 23/00
(Continued)

OTHER PUBLICATIONS

Igor, Jovanov "Performance of autonomous inflow control systems", University of Stavanger, Norway, 2016, p. 1-82. (Year: 2016).*

(Continued)

*Primary Examiner* — Hien D Khuu
(74) *Attorney, Agent, or Firm* — DeLizio, Peacock, Lewin & Guerra

(57) ABSTRACT

Embodiments for controlling flow rates within a well system are disclosed herein. In one embodiment, a first flow control configuration is determined including determining flow profiles for a plurality of zones each including at least one flow control device. Contaminant intake classifications associated with one or more of the zones are generated based on the first flow control configuration and a first contaminant level detected for a combined flow comprising inflow from the zones. A second flow control configuration for the zones is generated based on the contaminant intake classifications.

20 Claims, 7 Drawing Sheets

(58) Field of Classification Search
USPC .......................................................... 700/282
See application file for complete search history.

(56) References Cited

U.S. PATENT DOCUMENTS

| | | | |
|---|---|---|---|
| 9,388,686 B2 | | 7/2016 | Konorczunski et al. |
| 9,482,077 B2 * | | 11/2016 | Yeriazarian ............. E21B 43/12 |
| 10,280,722 B2 * | | 5/2019 | Bello ....................... E21B 43/14 |
| 2006/0243438 A1 | | 11/2006 | Brown et al. |
| 2008/0262735 A1 * | | 10/2008 | Thigpen ................... E21B 47/10 |
| | | | 702/6 |
| 2008/0262737 A1 | | 10/2008 | Thigpen et al. |
| 2009/0101329 A1 | | 4/2009 | Clem et al. |
| 2011/0146975 A1 * | | 6/2011 | O'Malley ............... E21B 47/10 |
| | | | 166/250.15 |
| 2015/0218931 A1 | | 8/2015 | Skinner |
| 2015/0284811 A1 * | | 10/2015 | Knight .................. E21B 49/086 |
| | | | 506/2 |
| 2016/0061003 A1 * | | 3/2016 | Gottumukkala ..... G05B 13/041 |
| | | | 166/50 |
| 2016/0356125 A1 * | | 12/2016 | Bello ...................... G06Q 50/02 |
| 2018/0075347 A1 | | 3/2018 | Alistarh et al. |
| 2018/0075349 A1 | | 3/2018 | Zhao et al. |
| 2018/0101769 A9 | | 4/2018 | Garner |
| 2020/0182047 A1 * | | 6/2020 | Langnes ................. E21B 43/26 |
| 2021/0277747 A1 * | | 9/2021 | Al Naimi ............... E21B 34/16 |

FOREIGN PATENT DOCUMENTS

| | | | |
|---|---|---|---|
| WO | 2018063149 A1 | 4/2018 | |
| WO | WO-2018152147 A1 * | 8/2018 | ............. E21B 41/00 |

OTHER PUBLICATIONS

PCT Application Serial No. PCT/US2018/063379, International Search Report, dated Aug. 14, 2019, 4 pages.

PCT Application Serial No. PCT/US2018/063379, International Written Opinion, dated Aug. 14, 2019, 4 pages.

"EquiFlow® Autonomous Inflow Control Devices", [online] retrieved on Mar. 15, 2018 from <https://www.halliburton.com/content/dam/ps/public/cps/contents/Data_Sheets/web/H/H08364-EquiFlowAICD.pdf>, 2017, 4 pages.

"EquiFlow® Nozzle Inflow Control Device", [online] retrieved on Aug. 13, 2015 from <https://www.halliburton.com/content/dam/ps/public/cps/contents/Data_Sheets/web/H/H010897.pdf>, 2014, 2 pages.

"EquiFlow® Sliding Side-Door® Inflow Control Device", [online] retrieved on Mar. 15, 2018 from <https://www.halliburton.com/content/dam/ps/public/cps/contents/Data_Sheets/web/H/H08626.pdf>, 2011, 2 pages.

"PetroGuard® Screen and EquiFlow® ICD with Remote-Open Valve", [online] retrieved on Mar. 15, 2018 from <https://www.halliburton.com/content/dam/ps/public/cps/contents/Data_Sheets/web/H/H08697.pdf>, 2011, 2 pages.

Burton, et al., "Multi-Zone Cased Hole Frac-Packs and Intelligent Well Systems Improve Recovery in Subsea Gas Fields", Society of Petroleum Engineers; SPE Annual Technical Conference and Exhibition, Oct. 9-11, San Antonio, Texas, USA, 2017, 26 pages.

Hailey, "Improved Sand-Screen Design for Multi-Joint Flow Control", Society of Petroleum Engineers; SPE Deepwater Drilling and Completions Conference, Sep. 10-11, Galveston, Texas, USA, 2014, 18 pages.

* cited by examiner

| TIME | P1% | P2% | FCC |
|---|---|---|---|
| T10 | 21.4 | 22.7 | FCC3.7 |
| T25 | 22.5 | 25.2 | FCC3.7 |
| T40 | 23.8 | 30.2 | FCC3.8 |
| ⋮ | ⋮ | ⋮ | ⋮ |

221

| ZONE | DEV/FLOW | ZONE IN | ZONE OUT |
|---|---|---|---|
| ZONE1 | FCD1/42.7  FCD2/62.5 | INJ SRC | ZONE2 |
| ZONE2 | FCD3/30.5 | ZONE1 | --- |
| ZONE3 | FCD4/18.8  FCD5/19.3 | --- | ZONE4 |
| ZONE4 | FCD6/22.4  FCD7/20.1 | ZONE3 | ZONE2 |
| ZONE5 | FCD8/19.0  FCD9/16.5 | ZONE6 | PROD |
| ZONE6 | FCD10/17.0  FCD11/20.6 | --- | ZONE5 |

| P1% | P2% | ΔT | SEQUENCE | ZONE1 | ZONE2 | ZONE3 | ZONE4 | ZONE5 | ZONE6 |
|---|---|---|---|---|---|---|---|---|---|
| 29.2 | 35.4 | 0.23.14 | FCC5.2-FCC5.3-FCC5.4 | NORMAL | HIGH | HIGH | HIGH | NORMAL | NORMAL |
| 33.1 | 60.4 | 1.20.35 | FCC2.3-FCC2.4-FCC2.5-FCC2.6 | HIGH | NORMAL | CRITICAL | NORMAL | NORMAL | HIGH |
| 40.8 | 35.5 | 0.12.29 | FCC11.5-FCC11.6 | NORMAL | NORMAL | NORMAL | NORMAL | HIGH | NORMAL |
| ⋮ | ⋮ | ⋮ | ⋮ | ⋮ | ⋮ | ⋮ | ⋮ | ⋮ | ⋮ |

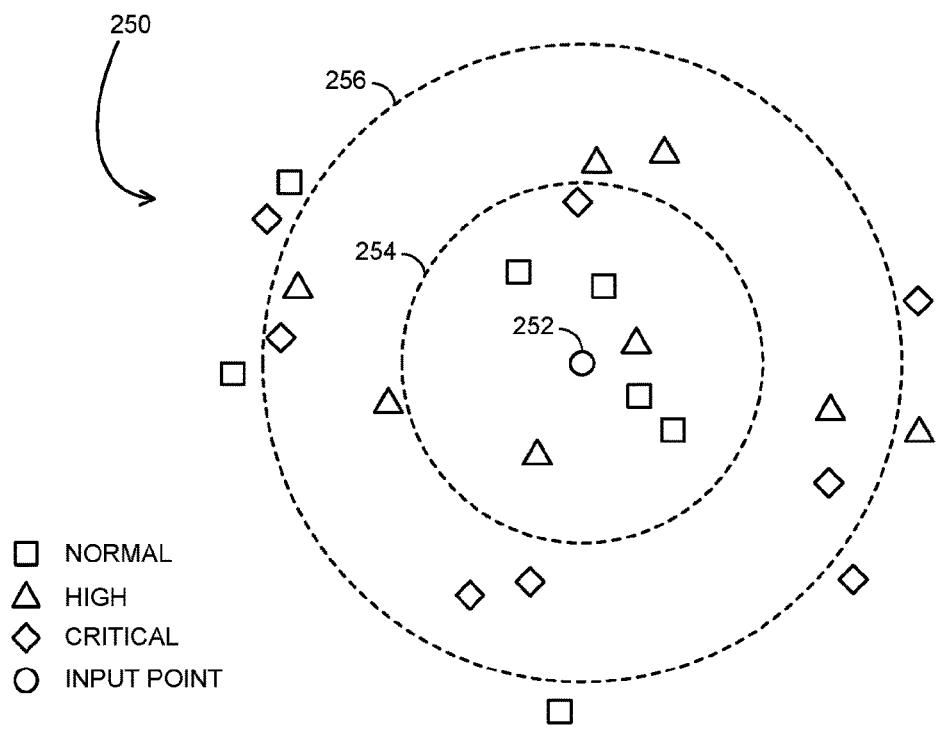

FIG. 2D

| ZONE | DEV/FLOW | |
|---|---|---|
| ZONE1 | FCD1/42.7 | FCD2/45.2 |
| ZONE2 | FCD3/30.5 | |
| ZONE3 | FCD4/18.8 | FCD5/14.5 |
| ZONE4 | FCD6/22.4 | FCD7/20.1 |
| ZONE5 | FCD8/19.0 | FCD9/16.5 |
| ZONE6 | FCD10/15.6 | FCD11/20.6 |

242a, 242b, 242c

FIG. 2E (operating single or mult-well flow control system)

FLOW RATE MANAGEMENT FOR IMPROVED RECOVERY

TECHNICAL FIELD

The disclosure generally relates to the field of fluid flow control, and more particularly to controlling flow of fluids within wells and well fields.

BACKGROUND

The fluid flow rates within wells such as production and injection wells are controlled for a variety of reasons. In addition to maintaining optimal production flows, flow control within wells may be utilized to optimize production flows for mature/end-of-life wells in terms of flow rate and fluid composition. A significant issue for some wells such as mature wells is water breakthrough, which can significantly decrease hydrocarbon production rates. Flow control devices are utilized to manage absolute and relative flow rates at various positions in one or more well flow paths based on return information such as water content within a return flow. Flow control systems are used to control flow (e.g., balance inflow along a horizontal well) throughout periods of hydrocarbon extraction and traditionally been relied on during the extraction completion period. Such flow control system typically includes one or more flow control devices that may be remotely controlled based on return flow information such as water cut.

BRIEF DESCRIPTION OF THE DRAWINGS

Embodiments of the disclosure may be better understood by referencing the accompanying drawings.

FIG. 2B depicts CI event sequence training records generated and processed by a classification trainer to generate a CI classification extensions in accordance with some embodiments.

FIG. 2C illustrates multiple multi-well contaminant level instance records generated and processed in accordance with some embodiments.

FIG. 2D depicts a conceptual representation of a k-NN map generated by a CI classifier in accordance with some embodiments.

FIG. 2E illustrates FCC assignment records having modified flow rate assignments in accordance with some embodiments.

DETAILED DESCRIPTION

Figure 1:
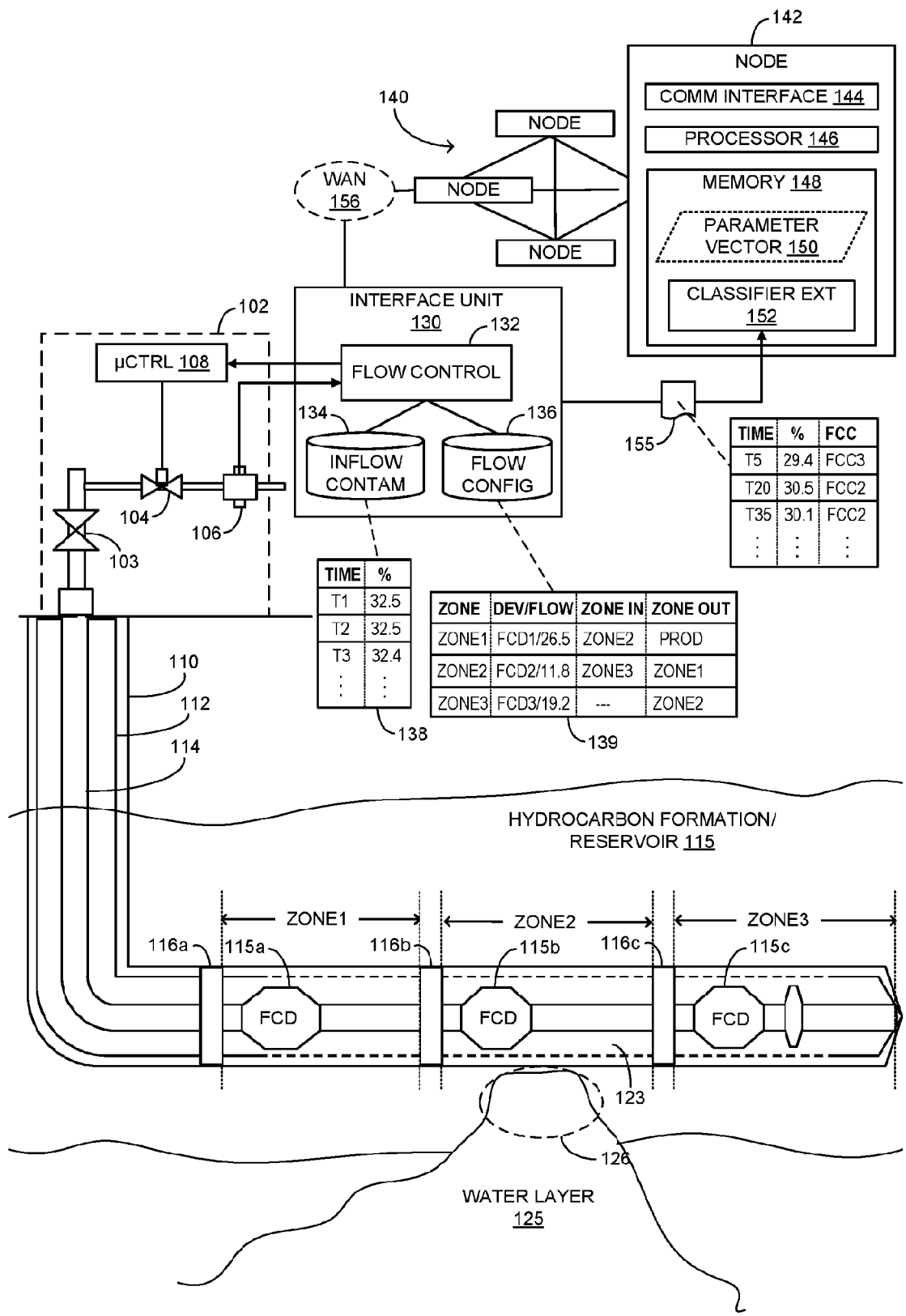
FIG. 1 is a partial cutaway diagram and partial block diagram depicting a fluid flow control system implemented within a well system in accordance with some embodiments.

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

OVERVIEW

The disclosed embodiments include systems, subsystems, devices, and hardware and software components for controlling flow rates of fluids such as oil, gas, water and mixtures of different fluids within a well field environment. The systems may include one or more computer systems that are interconnected and otherwise configured to determine flow control throttling for flow control devices deployed within a well field. One or more computer systems are configured using any combination of programmed components to receive flow control input information such as detection contaminant fluid level information. The computer systems generate and execute contaminant intake (CI) classification programs, referred to alternately as CI classifiers, which include one or more machine learning or other artificial intelligence components. In some embodiments, the computer systems may be configured as a neural network that may be configured to implement various forms of artificial intelligence such a genetic algorithms, simulated annealing, gradient descent, and perturbation analysis.

A contaminant detection component, such as a water cut sensor, is installed as part of the fluid intake subsystem within a production well head. A detected contaminant level is combined with a flow rate parameters corresponding to the configuration of flow control devices (FCDs) that control fluid flow within the well production/injection conduits. Example contaminant level metrics may include percent or ratio fluid contaminant per total fluid volume and or percent fluid contaminant per volume of one or more other constituent fluid components of the total volume (e.g., gas or liquid hydrocarbon component). In some embodiments, the contaminant level may constitute total amount (e.g., net volume) of a given contaminant substance. The flow rate parameters may include flow rate settings for FCDs that are assigned to respective flow zones. The contaminant level and flow parameters are recorded in mutual association in one or more CI status records. Based on information recorded in the CI status records, a flow control unit selects and executes a CI classifier to generate CI classifications for one or more of the zones and/or FCDs within the zones.

In response to detecting a fluid contaminant level that meets or exceeds a threshold value, the contaminant detection component generates and transmits a contaminant signal that specifies a quantified contaminant level. The contaminant signal is received by an interface unit that is configured to generate contaminant intake (CI) instance records. Each of the CI instance records associates a measured or otherwise detected contaminant level with a time stamp or other designator that can be utilized to correlate each recorded contaminant level with a the contaminant level value/metric is processed by a machine learning system, such as a neural network. The machine learning system processes contaminant levels individually or in combination with other quantified contaminant levels received from the same contaminant detection component or other components installed within other fluid intake systems such as may be installed in other wells. Based on the detected contaminant level in combination with other quantified contaminant levels, the machine learning system generates multivariate classification input vectors. The machine learning system includes one or more contamination classifications that are used to generate flow control signals that are transmitted to one or more associated flow control devices.

EXAMPLE ILLUSTRATIONS

FIG. 1 is a block diagram depicting a fluid flow control system implemented in conjunction with a well system in accordance with some embodiments. The flow control system includes a well head 102 comprising components for receiving and pumping hydrocarbon fluid, such as petroleum or natural gas, from a hydrocarbon formation 115, which may be a petroleum reservoir. The components within well head 102 include pumps, valves, and other flow control components some of which are not depicted. Included among the valves is a master valve 103 that controls all surface flow from the top of a production string comprising a production conduit 114, multiple inline flow control devices (FCDs) 115a-115c, and isolation packers 116a-116c among other components not depicted. Master valve 103 controls, in part, hydrocarbon production inflow to a production valve 104, which in the depicted embodiment is electronically actuated via microcontroller 108. Well head 102 further includes flow control components such as a microcontroller 108 and contaminant sensor 106 that are communicatively coupled with a local interface unit 130.

The production string includes an annular casing 112, which may be a cement casing disposed along the interior surface of a wellbore 110 that includes a section that is substantially vertical and a production section that is substantially horizontal. As depicted, the horizontal production sections of wellbore 110 and the production string are disposed at a depth within hydrocarbon formation 115. The inline series of flow control devices 115a-115c are deployed on the horizontal section of production conduit 114, each within a respective one of flow control zones, ZONE1, ZONE2, and ZONE3. The zones in the depicted embodiment comprise the portion of a production section between each of pairs of isolation packers 116a-116c that define mutually sealed sections of wellbore 110 that are interconnected by production conduit 114. Corresponding sections of casing 112 are perforated to enable fluid transmission from the surrounding formation through the wellbore 110 and into an annular region 123 within casing 112. While the depicted embodiment includes a cased production line, alternate embodiments may be implemented with production and/or injection lines that are disposed uncased within an open borehole.

FCDs 115a-115c comprise one or more types of conduit flow regulation devices such as valves, nozzles, and/or pumps. In some embodiments, FCDs 115a-115c may individually comprise a nozzle, a valve, or a combined nozzle/value device having electrically/electronically controlled fluid resistivity settings. FCDs 115a-115c are configured to restrict, shut off, and/or otherwise regulate fluid flow from the annular region between production conduit 114 and wellbore 110, into production conduit 114. FCDs 115a-115c may comprise self-powered pump and/or valve units that include local battery and power harvesting/generation units. For example, FCDs 115a-115c may incorporate or otherwise have power storage devices connected to respective turbine power generators that are driven by fluid flow between formation 115 and production conduit 114. Isolation packers 116a-116c typically comprise expandable elastomeric material configured to seal portions of the annulus along wellbore 110 to facilitate controlled inflow from the annulus area within casing 112 into and through sections of production conduit 114. In this manner, isolation packers 116a-116c form a part of the overall inflow control system for the well.

The combined flow control structure including FCDs 115a-115c together with isolation packers 116a-116c enable each of ZONE1, ZONE2, and ZONE3 to be controlled with full or partial independence. In this manner, the pressure drawdown on the formation material (e.g., rock material) adjacent to each zone can likewise be controlled with some level of mutual independence. Each of ZONE1, ZONE2, and ZONE3 may include a variety of well construction or reservoir features, such as formation fractures (hydraulically induced or otherwise), lateral breaches or breakthrough points, distinct reservoir layers, etc. For example, ZONE2 spans a region of wellbore 110 that is closely adjacent a water breakthrough region 126 that extends upward and into hydrocarbon formation 115 from a water layer 125. Breakthrough is generally a production well condition in which a liquid or gas fluid within a formation gains access into a production wellbore such as wellbore 110.

The fluid type and/or constituent components of the breakthrough fluid is a form of contaminant, the level of which is limited or otherwise controlled utilizing the systems and techniques disclosed herein. The occurrence and severity of breakthrough can be significantly impacted by the flow settings of FCDs 115a-115c. The pressure within the annular region within a zone, such as annular region 123 within ZONE2, is reduced by opening (i.e., eliminating or reducing flow restriction setting) one or more FCDs within the zone so that fluid communication is established with production conduit 114. The pressure within production conduit 114 may be controlled in part by the flow setting of surface production valve 104. It is therefore the flow settings of FCDs 115a-115c that each determine corresponding pressure drops between the annular regions within each of the zones and production conduit 114 during fluid flow. The magnitudes of the pressure drops are determined by the FCD flow settings in each zone. Fluid flow from portions of hydrocarbon formation 115 proximate each of ZONE1, ZONE2, and ZONE3 is induced by a pressure gradient generated by the reduced pressure within the zonal annular regions within wellbore 110.

The systems, components, operations, and functions described herein implement a method by which machine learning type artificial intelligence mechanisms are utilized to minimize or otherwise control contamination levels within product inflow by controlling flow settings of FCDs for sets of production and/or injection zones, such as ZONE1, ZONE2, and ZONE3. More specifically, the machine learning mechanisms are configured to determine contamination/breakthrough related classifications for zones. The overall flow contaminant intake control system is further configured to utilize the classifications to modify or otherwise determine flow control configurations.

The electrically or otherwise remotely controllable portion of the inflow control system includes FCDs 115a-115c. In the depicted embodiment, flow control signals may be generated and transmitted by processing and communication components within interface unit 130, which includes a flow control module 132. Flow control module 132 comprises any combination of program instructions and data configured to determine flow control settings for each of FCDs 115a-115c within flow control zones, ZONE1, ZONE2, and ZONE3, respectively. Collectively, two or more of the flow control settings comprise a flow control configuration (FCC) for the well. Flow control module 132 determines the flow control settings based, at least in part, on a contamination level signal input to interface unit 130 from a contaminant sensor 106. Contaminant sensor 106 includes sensor components, such as capacitance sensor components, configured to measure, detect, or otherwise sense levels of an inflow contaminant such as water levels within a petroleum inflow from production valve 104.

Contaminant sensor 106 may be a programmable sensing device that detects/measures contaminant levels continuously, periodically, and or asynchronously. The detected contaminant level values are transmitted to or otherwise received by flow control module 132 which includes program instructions for translating or otherwise reading/decoding the signal from contaminant sensor 106. In some embodiments, flow control module 132 records the contaminant levels in table records maintained by an inflow contamination database 134. For example, flow control module 132 may record contamination level values, such as in the form of fluid content percentages, in association with corresponding timestamp values within each of multiple contaminant level records 138. As shown, each of contaminant level records 138 are sequentially recorded with corresponding timestamps (e.g., time of detection from sensor 106) such as T2 which may be recorded as an absolute time value (hour, minute, second). Each of contaminant level records 138 associates a timestamp with a contaminant level value in the form of a percent of total inflow fluid volume such as 32.5% for timestamp T2.

In some embodiments, flow control module 132 may generate and transmit flow control setting signals to microcontroller 108, which while depicted in FIG. 1 as separate from production valve 104, may be incorporated as part of an actuator disposed within an actuator for production valve 104. The flow control signals are transmitted to microcontroller 108 in direct, real-time sequential association with the sequence of contaminant level signals received from sensor 106. Alternatively, or in addition, flow control module 132 may generate and transmit flow control setting signals for setting and modifying the flow settings of production string FCDs such as FCDs 115a-115c. The flow control settings are generated in response to CI classification information generated by and received from a machine learning system 140 via a wide area network 156. Interface unit 130 includes components such as electronic transmission and/or fluid pressure signal generating components for remotely communicating flow settings to the FCDs. In some embodiments, interface unit 130 and the FCDs include wireless communication interfaces enabling interface unit 130 to communicate using, for example, acoustic telemetry via the metal piping of production conduit 114 and/or acoustic telemetry through the fluid within production conduit 114. Telemetry may also be achieved between interface unit 130 and the FCDs by encoded flow rate variations in the production/injection fluid, and/or encoded fluid pressure variations in the production/injection fluid. In these or alternative embodiments, various forms of electromagnetic and/or optimal telemetry may be utilized including physically conveyed electrical/optical signals or wirelessly transmitted fields signals.

The depicted machine learning system 140 comprises a multi-processor system including multiple interconnected processing nodes that may collectively form a parallel processing system that implements one or more type of machine learning such as a neural network in which each node is a respective node of the neural network. Machine learning system 140 comprises any combination of hardware, firmware, and software program logic configured to implement one or more artificial intelligence schemas such as a k-Nearest Neighbor (k-NN) supervised learning algorithm.

In addition to contaminant level records 138, flow control module 132 generates and stores flow control configuration (FCC) records within a FCC database 136. For instance, flow control module 132 generates an FCC record 139 that includes three row-wire zone sub-records that each associates a zone identifier (e.g., ZONE2) of the zone corresponding to the record with FCD identifier (ID) and FCD flow setting information. For example, the second row-wise zone record within FCC record 139 associates zone ID "ZONE2" with a device ID "FCD2" that corresponds to FCD 115b, and a flow setting value "11.8" that FCD 115b is/was set at. Each of the zone records within FCC record 139 further associates the zone ID, FCD ID, and flow setting with zone IDs for zones from which or to which fluid flows to or from the zone. For example, the second row-wise zone record associates "ZONE3" as the inflow source (ZONE IN) and "ZONE1" as the outflow sink (ZONE OUT) for "ZONE2" within the ZONE2 record, consistent with the depiction in FIG. 1 of ZONE2 as receiving production inflow from ZONE3 and issuing production outflow to ZONE1. In some embodiments, FCC records such as FCC record 139 is generated in response to flow control module 132 detecting or otherwise determining that the configuration of FCDs and/or the flow settings of one or more of the FCDs has been modified. The flow settings information such as recorded in the FCC records may be obtained as part of the flow settings assignments and modification processes described herein. In some embodiments, one or more of the individual FCDs may include respective flow rate detectors that can be utilized to determine flow rates in one more zones which may be communicated in real time by local FCD communication interfaces to flow control module 132. In other embodiments, the operation of flow control module 132 in determining and resetting flow conditions is independent of downhole flow sensors.

Flow control module 132 comprises program instructions for generating contaminant level records 138 and FCC records and for generating contaminant level (CL) instance records 155 that combine information from each of contaminant level records 138 and the FCC records. As illustrated, each of CI instance records 155 associates a contaminant level value (percent of fluid volume in the depicted example) with a timestamp and an ID of a particular FCC. For example, the second row-wise CI status record within records 155 associates a contaminant level of 30.5% with a timestamp of T20 (in hour-minute-second coded format for example) and a FCC ID FCC2. FCC2 and other FCC IDs may each comprise an alphanumeric string representing a particular FCC such as represented by FCC record 139 that was recorded at an associated timestamp the same as or proximate to timestamp T20.

Interface unit 130 transmits CI instance records 155 to one or more of the computation nodes, such as a node 142, within machine learning system 140. While not expressly depicted, node 142 comprises processing and memory components as well other hardware and software components for receiving, storing, processing, and transmitting information to and from interface unit 130 as well as to and from others of the nodes within machine learning system 140. Flow control module 132 generates CI instance records 155 based on the combined content of CI records 138 and FCC records such as by correlating timestamp values between the records to provide a time sequence of contamination levels and co-existent FCCs that can be processed by machine learning system 140 to determine contaminant intake classifications for aspects of the FCCs, enabling efficient flow configuration modification sequences.

Node 142 includes a communication interface 144 that comprises any combination of hardware and software, such as network adapter components, configured to enable communication with the other nodes within machine learning system 140 and interface unit 130. Node 142 further includes a processor 146 and a memory 148 for storing, executing, and otherwise processing program code and input data including a classifier extension 152 and a parameter vector 150. Classifier extension 152 may comprise a run-time-selectable plugin program or routine including program instructions for determining contaminant intake (CI) classifications in association with corresponding zones that include at least one FCD. The CI classifications may comprise a fixed set of labels that each characterize the nature (e.g., severity) of the inflow of contamination associated with each zone in a given FCC. As depicted and described in further detail with reference to FIG. 2, classifier extension 152 may be generated, in part, by an extension generator that generates pattern recognition code by executing a classification trainer program.

Parameter vector 150 is a multivariate vector data construct that includes specified parameters that in combination indicate a multivariate pattern. In some embodiments, the pattern includes flow control configuration parameters (flow profiles) for the zones and an associated contamination level. Parameter vectors such as parameter vector 150 may be received as input and processed by classifier extensions such as classifier extension 152 to generate contaminant intake classifications for the zones. A current flow control configuration can be modified based on the contaminant intake classifications and the entire process repeated as necessary based on a series of subsequent contamination levels detected by sensor 106. In this manner, flow control adjustments may be implemented based on the severity of contaminant breakthroughs, such as may occur in the depicted ZONE2, which are identified based on the combined zone-based CI classifications. As depicted and described in further detail with reference to FIG. 2B, parameter vectors may also be recorded and subsequently applied in classifier training phase. Parameter vectors be generated and associated with the contaminant intake classifications to generate supervised training records with the classifiers serving as the supervising value for each record.

Figure 2A:
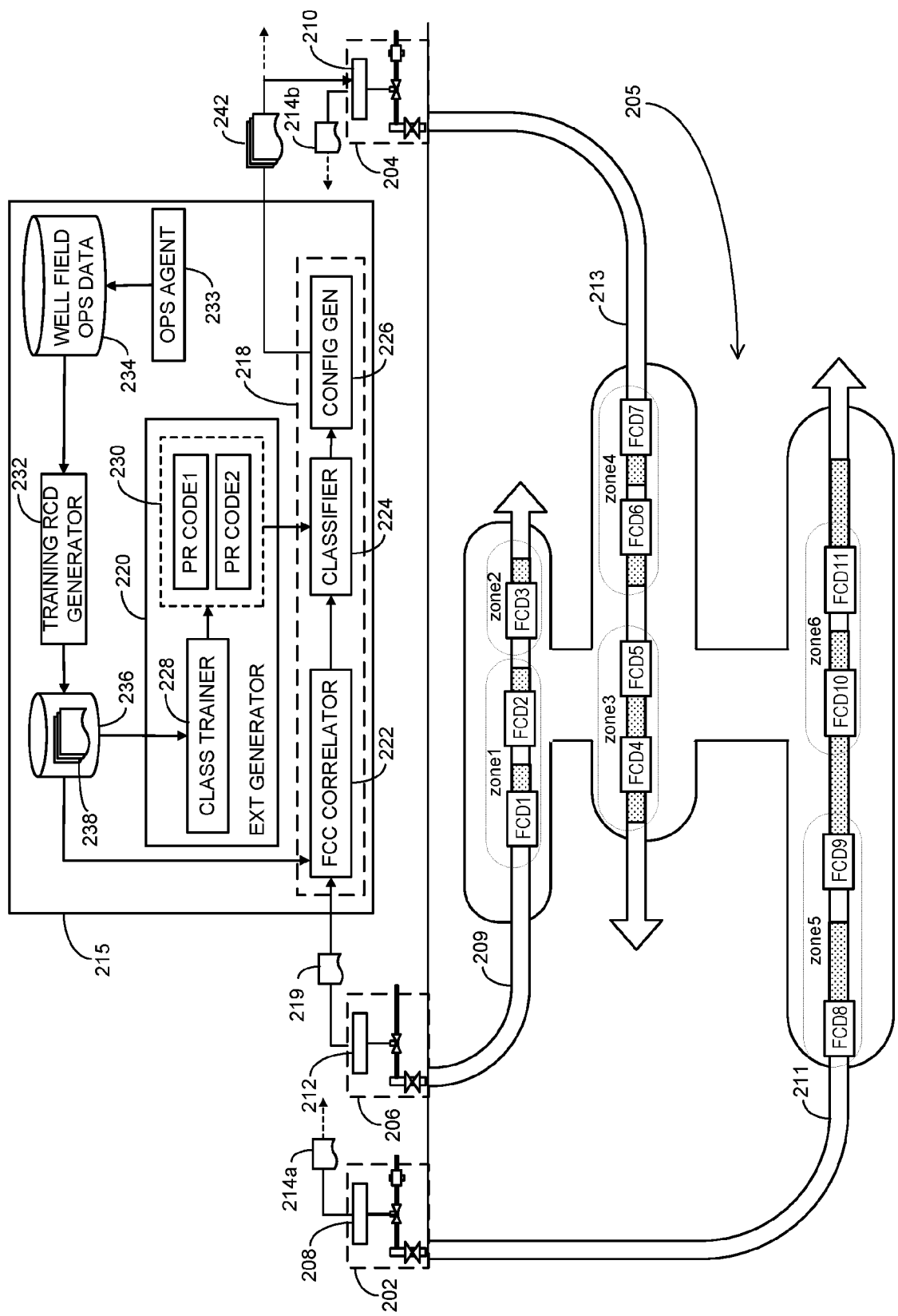
FIG. 2A is a partial cutaway diagram and partial block diagram illustrating a flow control system that implements supervised flow control in accordance with some embodiments.

FIG. 2A is a partial cutaway diagram and partial block diagram illustrating a flow control system that implements supervised flow control in accordance with some embodiments. The flow control system is at least partially incorporated in a multi-well field that includes two production wells having well heads 202 and 204 and one injector well having well head 206. Injection well head 206 includes pumps, valves, controllers and other components for regulating outflow of liquid and/or gas fluids to an injection string comprising an injection conduit 209 deployed through multiple FCDs including FCD1, FCD2, and FCD3. The injection fluid may, for example, be water that is pressured, in part, by components within injection well head 206. The injection fluid is directed by the positional deployment and flow settings of each of FCD1, FCD2, and FCD3 to portions of a hydrocarbon formation 205 in which the injection string is deployed.

Production well heads 202 and 204 include pumps, valves, controllers and other components for regulating inflow of liquid and/or gas fluids from their respective production strings. The production string for well head 202 comprises a production conduit 211 deployed through multiple FCDs including FCD8, FCD9, FCD10, and FCD11. The production string for well head 204 comprises a production conduit 213 deployed through multiple FCDs including FCD4, FCD5, FCD6, and FCD7. The production fluid typically comprises hydrocarbon fluid content mixed with other fluids and some solids, wherein one or more of the non-hydrocarbon fluids (e.g., water) may be classified as contaminants. The production fluid is pressured, in part, by negative pressure inducing components at the surface within well heads 202 and 204 and are also pressured as an inflow based on flow settings of the production FCDs. The production fluid inflow for each of the two production wells is directed by the positional deployment and flow settings of the FCDs of each of the respective wells from portions of hydrocarbon formation 205 in which each of the production strings is deployed.

The well heads depicted in FIG. 2A may be similarly configured to include some or all of the same components and performing some or all of the same operations and functions as well head 102 in FIG. 1. In addition to injection cutoff/throttling components, injection well head 206 includes an interface unit 212 that is communicatively coupled with a CI controller 215. Similar to interface unit 130 in FIG. 1, interface unit 212 includes hardware and software processing and communication components, including a flow control module (not expressly depicted) that generate and transmit flow control signals to FCD1, FCD2, and FCD3, as well as to the surface injection cutoff valve. The flow control module components within interface unit 212 include any combination of processing and communication hardware and program instructions and data configured to determine flow control settings for each of FCD1 and FCD2, with system-designated ZONE1, and for FCD3 within ZONE2.

Each of producer well heads 202 and 204 also includes a microcontroller actuated production valve deployed inline with a contaminant level (e.g., water level) sensor. Producer well heads 202 and 204 further include interface units 208 and 210, respectively, that each include one or more of the same components and perform the same operations and functions as interface unit 130 in FIG. 1. The interface unit components include components for determining or modifying flow control settings based, at least in part, on contamination level signals received by the respective interface units from the respective contaminant level sensors in each of well heads 202 and 204. As with contaminant sensor 106 in FIG. 1, the contaminant sensors deployed within well heads 202 and 204 includes sensor components, such capacitance sensor components, configured to measure, detect, or otherwise sense levels of an inflow contaminant such as water levels within a hydrocarbon fluid inflow.

The flow control components within each of interface units 208 and 210 receive and process the contaminant level values detected by the respective contaminant level sensors at a series of times, such as at a specified periodic interval. The flow control components include program instructions for translating or otherwise reading/decoding the signal from the contaminant level sensors and recording the contaminant levels in table records maintained by an inflow contamination database that may be configured similarly to database 134 in FIG. 1. The flow control components may record contamination level values, such as in the form of fluid content percentages, in association with corresponding timestamp values within each of multiple contaminant level records such as records 138 in FIG. 1, wherein each of the detected contaminant level values are sequentially recorded with corresponding timestamps.

Similar to flow control module 132 in FIG. 1, the flow control components in each of interface units 208 and 210 also generate and store FCC records each comprising multiple zone records that each associates a zone identifier with FCD and FCD flow setting information. Each of the zone records further associates a zone ID, FCD ID, and flow setting with zone IDs for zones from which or to which fluid flows to or from the zone. The flow control components within interface units 208 and 210 may generate one or more of the FCC records in response to detecting or otherwise determining that the configuration of FCDs and/or the flow settings of one or more of the FCDs has been modified.

Each of interface units 208 and 210 further includes program components for generating CI instance records 214a and 214b from the contaminant level records and FCC records. The program components include program instructions for generating the CI instance records by combining the detected contaminant level value information from the contaminant level records with the FCD flow settings and inter-zone inflow/outflow information from the FCC records. For example, CI instance record 214a includes a contaminant level field that records a contaminant level detected by a sensor within well head 202 at a time point that is recorded in a timestamp field. CI instance record 214a further includes a FCC ID corresponding to a FCC deployed for ZONE5 and ZONE6 at the time point. Interface unit 212 includes program components configured to generate FCC records including a FCC record 219 that specifies the flow settings of FCDs and inter-zone inflow/outflow information for ZONE1 and ZONE2.

FIG. 2B illustrates a set of multi-well CI instance records 221 that each associates contaminant level values for the two producer wells with a timestamp and an ID of a corresponding multi-well FCC that is deployed at the time the contaminant level values were detected/measured. Each of the depicted row-wise CI instance records 221 combines information from producer well CI instance records and information from injection well FCC records. For example, the third row-wise CI instance record within records 221 associates a producer well1 contaminant level of 23.8% and a producer well2 contaminant level of 30.2% with a timestamp of T40 (in hour-minute-second coded format for example) and a FCC ID FCC3.8. FCC3.8 and the other FCC IDs may each comprise an alphanumeric string representing a particular FCC for the zones within each of the respective injection and production wells in the multi-well system. FCC ID FCC3.8 maps to a FCC record 223 that combines the FCC records collected by interface unit 208 for ZONE5 and ZONE6, by interface unit 210 for ZONE3 and ZONE4, and by interface unit 212 for ZONE1 and ZONE2.

Interface units 208 and 210 transmit CI instance records 214a and 214b, respectively, and interface unit 212 transmits FCC record 219 to a machine learning computation node in the form of CI controller 215. CI controller 215 is configured, using any combination of coded hardware, firmware, and software to perform flow control operations such as those implemented by machine learning system 140 in FIG. 1. CI controller 215 includes a flow control unit 218 that is configured to generate CI classifications for zones and/or FCDs within the zones based on FCC information and contaminant level information determined from CI instance records such as 214a and 214b for producer wells and FCC records such as FCC record 219 from injection wells.

Flow control unit 218 includes an FCC correlator 222 that receives and processes CI instance records 214a and 214b together with FCC record 219 to generate a multi-well CI instance record such as the third row-wise record within multi-well CI instance records 221. FCC correlator 222 is configured to generate the multi-well CI instance record by combining the FCC information for ZONE1 and ZONE2 from FCC record 219, the FCC information for ZONE3 and ZONE4 from FCC record 214a, and the FCC information for ZONE5 and ZONE6 from FCC record 214b. The combined, multi-well FCC information may be included in or mapped via corresponding FCC ID FCC 3.8 to corresponding contaminant levels 23.8 and 30.2 detected at production well heads 202 and 204, respectively. Multi-well CI instance records 214 may be retrieved by an operations agent 233 and recorded in a well operations database 234 that stores contaminant level, FCC, and other operational information that can be processed to determine patterns between FCCs and contaminant intake events such as water breakthrough events.

FCC correlator 222 generates the multi-well CI instance records that are further processed by a supervised classifier 224 to generate CI classifications for the well zones. The generated CI classifications are processed by a configuration generator 226 to determine modifications to the flow settings for FCDs within the zones based on the zonal CI classifications.

In addition to generating multi-well CI instance records, FCC correlator 222 is configured to correlate the FCC and contaminant level information in CI instance records 221, individually or in combination, with FCCs identified and otherwise recorded in a CI event database 236. CI event database 236 records FCCs that are associated with events in which, for example, detected contaminant levels exceeded a specified threshold (e.g., water level >30%). As illustrated in FIG. 2C in conjunction with FIG. 2A, a set of CI event records 238 each associate detected contaminant levels (P1 and P2) with a time period over the event and corresponding FCC reconfiguration sequence occurs ($\Delta T$) and a sequence of FCCs that were sequentially deployed over each of the event periods. For example, the second row-wise CI event record associates production well1 level of 33.1% and production well2 level of 60.4% with a sequence of four FCCs beginning with FCC2.3 and ending with FCC2.6. FCC correlator 222 compares FCC and/or contaminant level information with a generated well CI instance record with corresponding FCC and/or contaminant level information within the CI event records 238 to select a pattern recognition program or routine such as PR CODE1 or PR CODE2 from a set of CI classification extensions 230.

FIG. 2C illustrates example CI event records 238 generated by training record generator 232. CI event records 238 include the FCC and contaminant level information collected within operations database 234 such as by operations agent 233 from each of interface units 208, 210, and 212 during operation of the corresponding production and injection wells. CI event records 238 are generated by training record generator 232 as supervised learning training records. Each of CI event records 238 combines FCC information patterns (i.e., combinations of multiple different types of FCDs, FCD flow settings, and inter-zone inflow/outflow configurations) with corresponding contaminant level patterns. The resultant CI event records 238 each provide a distinct supervised training input having multivariate input vectors comprising the FCC ID sequence fields and associated (e.g., logically mapped via relational tables) FCC record information, and the multiple contaminant level fields. As further illustrated each CI event records 238 further include zone classification fields containing zone-associated classifiers, each of which serving as a supervising value for each record.

The training records such as CI event records 238 generated by training record generator 232 are received and processed by a classification extension generator 220. Extension generator 220 is configured, using any combination of program logic and data, to process training records to generate classification extension/plugin code that can be utilized to classify the CI severity status of one or more well zones during multi-well well field operation. Extension generator 220 includes a classification trainer 228 that receives a series of training records such as CI event records 238 as supervised training data input and processes the records to generate classification extensions 230 that each include respectively configured pattern recognition code. Classification extensions 230 are individually depicted as pattern recognition code1 and pattern recognition code2 (PR CODE1 and PR CODE2). Classification trainer 228 processes the classifier-supervised training records generated by training record generator 232 to generate the CI classification extensions/plugins 230. Classification trainer 228 is configured to execute a supervised learning function on the labelled training data to generate the pattern recognition code.

The multi-well CI instance records generated by FCC correlator 222 are received and processed by CI classifier 224 that includes one or more of the CI classification extensions 230 called or otherwise retrieved from extension generator 220. When executed, CI classifier 224 generates a multidimensional feature space that was determined by classification trainer 228 during the training phase. A conceptual representation of an example k-NN map feature space is illustrated in FIG. 2D. As shown in FIG. 2D, the feature space 250 is populated with multiple training value points each having a respective assigned CI classification. The depicted squares are points in the feature space each classified by classification trainer 228 as NORMAL, the triangles are points each classified as HIGH, and the depicted diamonds are points each classified as CRITICAL.

During classification, CI classifier 224 determines a position of an input point 252 within feature space 250. Input point 252 represents the combination of FCDs, FCDs settings, inter-zone inflow/outflow configurations, and production contaminant levels recorded within a given input multi-well CI instance record received and processed by CI classifier 224 from FCC correlator 222. For k-NN pattern classification, the relative spacing between and among the training points and input point 252 may be computed as Euclidean distances. In this manner, CI classifier 224 computes a relative positioning of input point 252 among the training points which includes, at least in part, determining a Euclidean distance between the multivariate data represented by input point 252 and the multivariate data represented by each of the training points.

To further implement k-NN pattern classification, CI classifier 224 partitions the feature space 250 into which the training points are mapped with respect to both the position of input point 252 and an input integer value for k. The partitions are represented in FIG. 2D as circular/radial boundaries centered at input point 252 and having a radius determined by a number of nearest neighbors (specified by k) used for classification. As shown, CI classifier 224 determines a radial distance partition 254 for a value of k=7 in which the closest seven "neighbor" training points are included. If CI classifier 224 executes the pattern classification algorithm with a value of k=16, the radial distance is determined to be radial distance partition 256. For k=7, CI classifier 224 classifies input point 252 as being or corresponding to the NORMAL classification since a majority (four of the seven) training points within partition 254 are classified as NORMAL. For k=16, CI classifier 224 classifies input point 252 as being or corresponding to the HIGH classification based on determining that a largest plurality (six of sixteen) training points within partition 256 are classified as HIGH.

Having classified the zones in one or more cross-domain records, CI classifier 224 transmits the classifications and corresponding zone and FCD IDs to configuration generator 226. Configuration generator 226 is configured to modify the flow settings, and in particular, the flow resistance settings of the FCDs based on the CI classifications assigned to each of the zones. For example, based on determining that the CI classifications for ZONE3 is critical and for ZONE6 is high, configuration generator 226 may modify the flow resistivities of FCDs by increasing the outflow resistivity for FCD2 in ZONE1 and also increasing the inflow resistivity for FCDs 4 and 5 in ZONE3. In some embodiments, configuration generator 226 may begin FCC modifications by generating modified FCC assignment records such as in records 242a-242c in FIG. 2E. As represented in FIG. 2A, the records 242 are transmitted by configuration generator 226 to each of interface units 208, 210, and 212 to implement modification of FCD flow settings.

Figure 3:
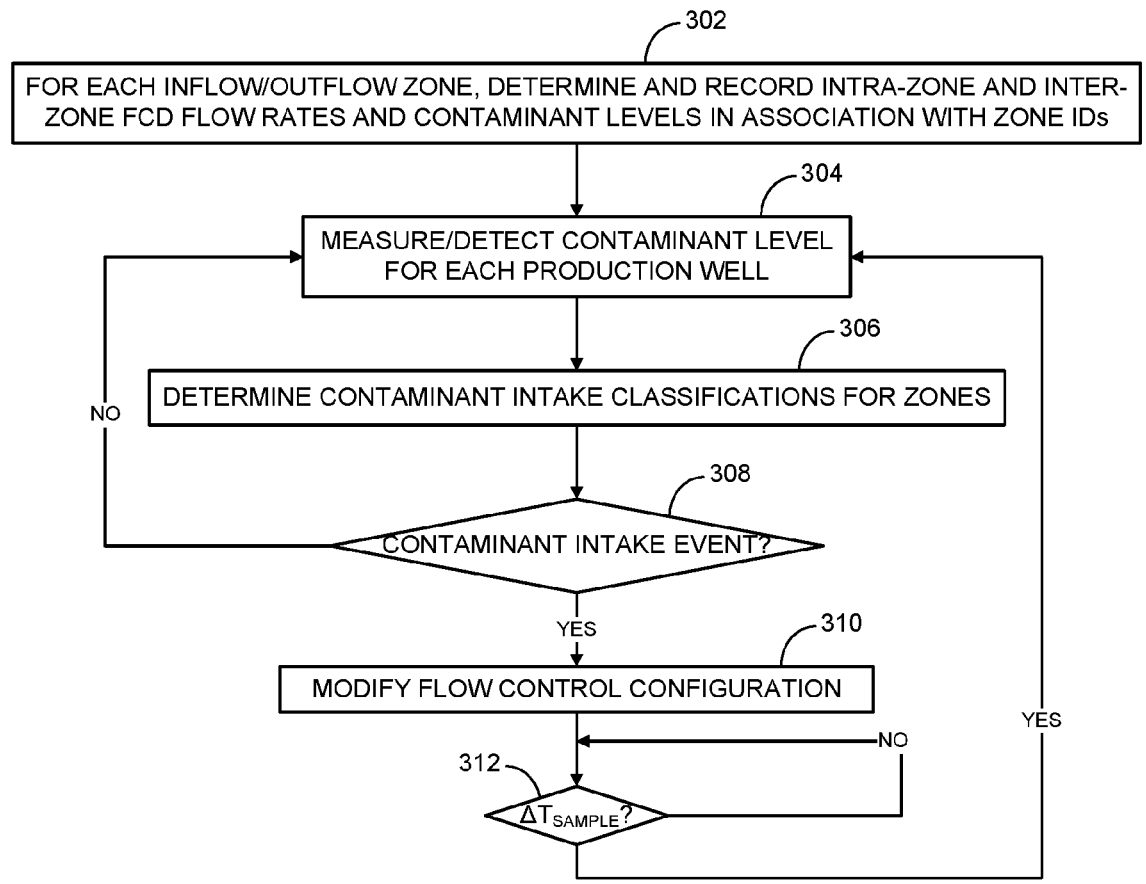
FIG. 3 is a flow diagram depicting operations and functions for configuring and operating a single or multi-well flow control system in accordance with some embodiments.

FIG. 3 is a flow diagram depicting operations and functions for configuring and operating a single or multi-well flow control system in accordance with some embodiments. The operations and functions depicted and described with reference to FIG. 3 may be performed by one or more of the systems, sub-systems, devices, and components illustrated and described with reference to FIGS. 1 and 2. The process begins as shown at block 302 with one or more local interface units for one or more corresponding wells determining and recording the FCCs including FCD IDs and corresponding FCD flow rate settings. Also at block 302, contaminant sensor components measure or otherwise detect contaminant levels for inflows from the zones that include the FCDs.

With the current FCCs for the zones of the one or more production and/or injection wells having been recorded, contaminant sensor continue to detect/measure contaminant levels continuously or periodically at block 304. The process continues as shown at block 306 with a machine based flow control unit, such as flow control unit 218 in FIG. 2A, determining CI classifications for each of the zones. As depicted at inquiry block 308, in response to determining that a contamination event has not occurred based on the detection at block 306, control passes back to the continuous or periodic contamination measurements at block 304. If, as determined at block 308, a contamination event has occurred (e.g., a severe breakthrough or a threshold exceeded), control passes to block 310 at which a configuration generator, such as configuration generator 226, in combination with well interface FCD communication components modify the FCCs for one or more of the zones based on the CI classifications determined at block 306. Following FCC modification and proceeding to block 312, control passes back to block 304 for re-testing following a specified re-configuration interval.

Figure 4:
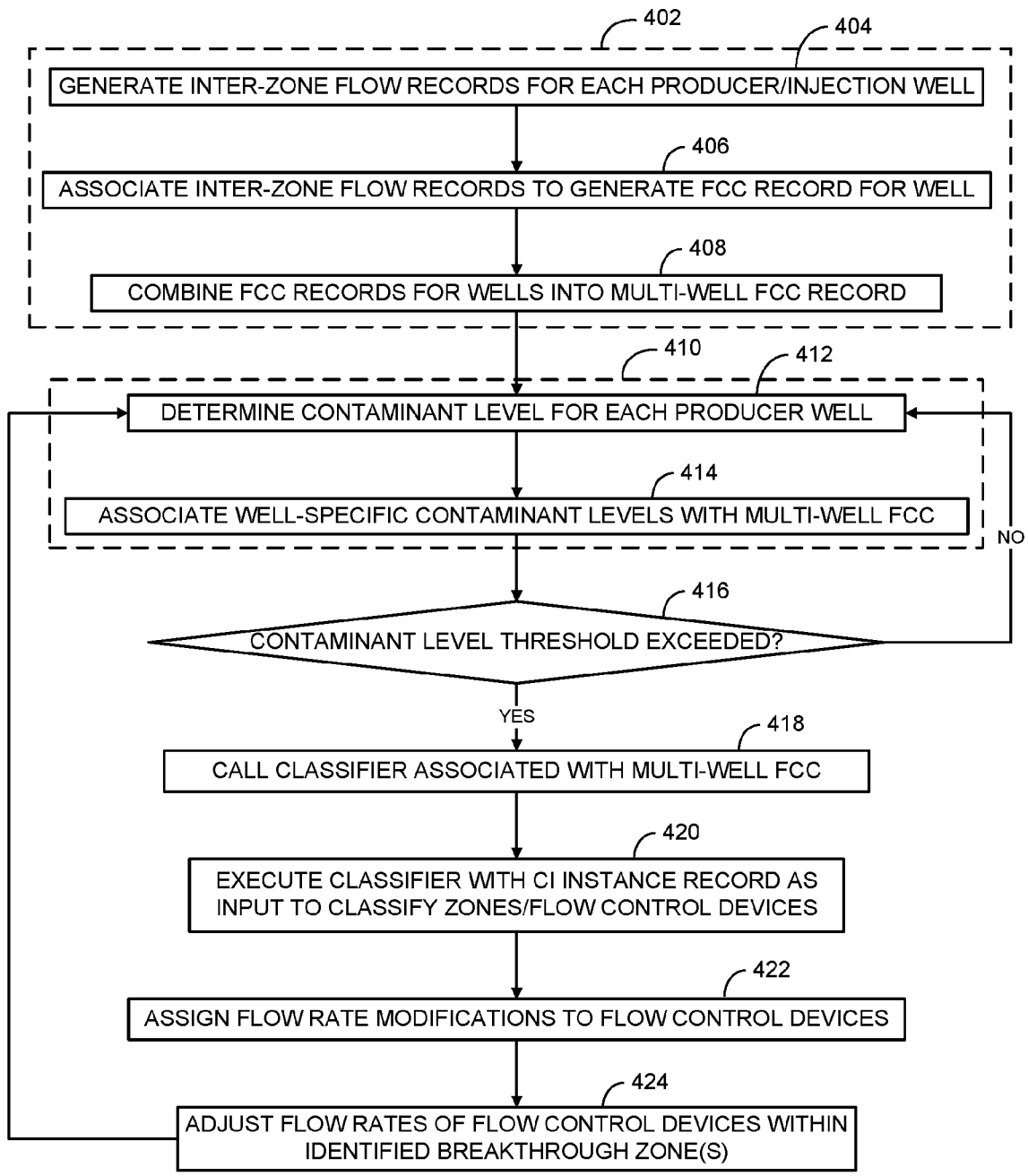
FIG. 4 is a flow diagram illustrating operations and functions for modifying flow control configurations based on identified contaminant breakthrough zones in accordance with some embodiments.

FIG. 4 is a flow diagram illustrating operations and functions for modifying flow control configurations based on identified contaminant breakthrough zones in accordance with some embodiments. The operations and functions depicted and described with reference to FIG. 4 may be performed by one or more of the systems, sub-systems, devices, and components illustrated and described with reference to FIGS. 1 and 2. The process begins at superblock 402 with an interface unit such as interface unit 130 in FIG. 1 determining and recording FCC parameters for each of the production and/or injection well zones being managed. The FCC determination begins at block 404 with a flow control unit, such as flow control unit 132, determining flow profiles for the zones and generating corresponding inter-zone flow records for each of the wells. At block 406, the flow control unit associates individual inter-zone flow records, such as the row-wise records within FCC record 139, to generator one or more FCC records. In some embodiments, one FCC record is generator for each individual production or injection well. The FCC determination sequence concludes at block 408 with the flow control unit combining the inter-zone records for a given well to generate an individual or multi-well FCC record.

The breakthrough identification process continues at superblock 410 with an interface unit and other local well components, generating one or more CI instance records. The CI instance record generation begins at block 412 with contaminant sensor(s) measuring/detecting contaminant level(s) at one or more producer wells and generating contaminant level records that record a series of contaminant level values associated with corresponding timestamps. At block 414, the flow control units for each well generate the CI instance records, such as CI instance records 155 in FIG. 1, that mutually associate the contaminant levels with corresponding FCCs.

Contaminant sensing continues through the process, and as shown at inquiry block 416, the contaminant level detection continues until a contaminant threshold is exceeded at which point control passes to block 418. At block 418, components such as a FCC correlator within a CI controller call or otherwise retrieve a classifier program or routine to determine zone CI classifications. For example, a FCC correlator such as FCC correlator 222 may call a CI classification extension generator that is associated with a multi-well FCC specified by a CI instance record generated by the correlator as described with reference to FIG. 2. At block 420, the CI controller executes a CI classifier that includes, at least in part, the called classifier code with the generated CI instance record as input. The CI classifier assigns CI classifications to one or more of the zones at block 420 and control passes to block 422 with CI controller components such as a configuration generator assigning flow setting modifications for one or more of the FCDs. A full cycle of the process concludes at block 424 with local well communication components such as the interface units depicted in FIGS. 1 and 2 remotely adjusting the flow settings of the FCDs based on the assigned flow setting modifications.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
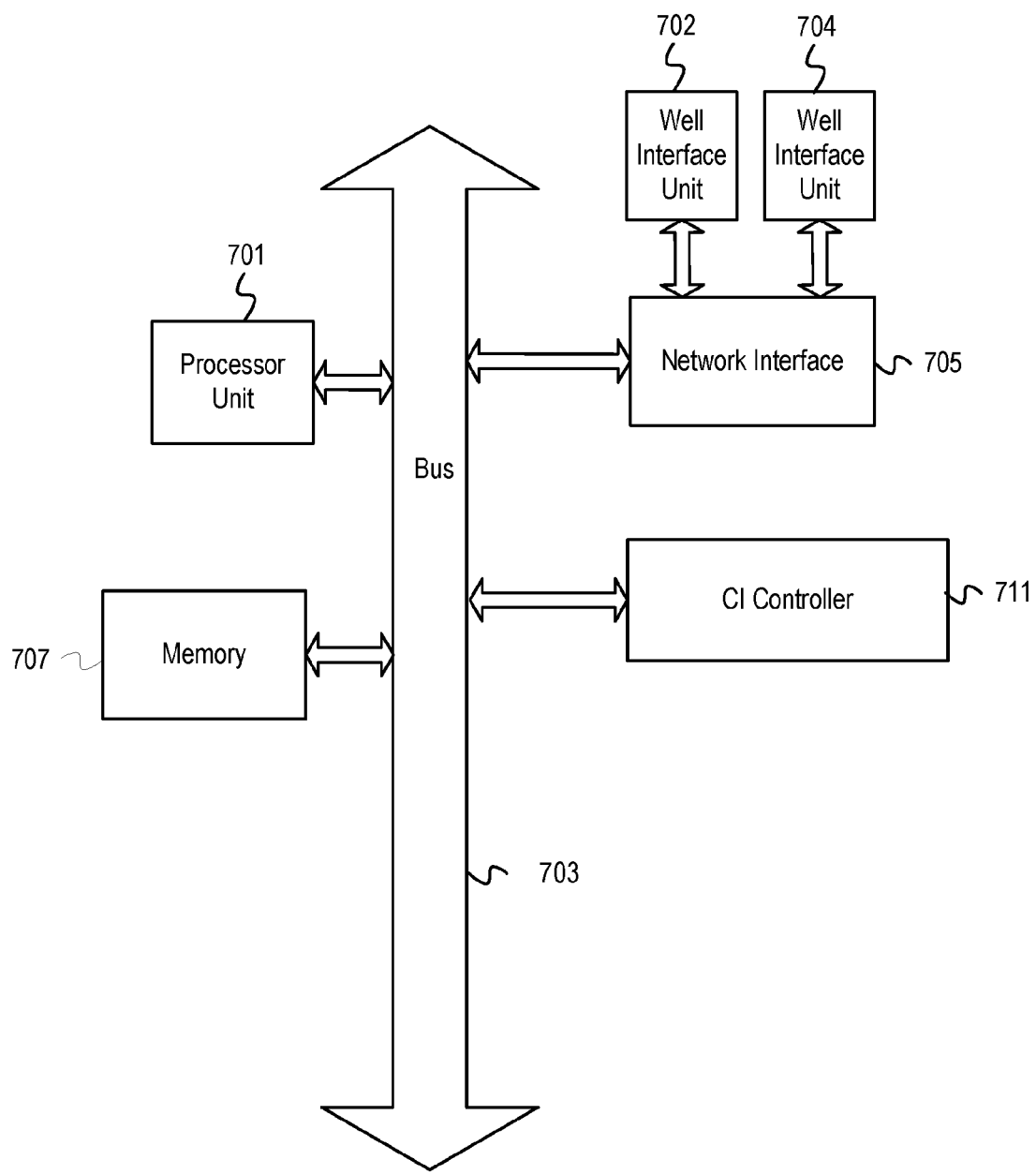
FIG. 5 is a block diagram depicting an example computer system that may be utilized to implement a flow control system in accordance with some embodiments.

FIG. 5 depicts an example computer system for controlling flow rates in one or more wells in accordance with some embodiments. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.) and a network interface 505 (e.g., a Fiber Channel interface, an Ethernet interface, an internet small computer system interface, SONET interface, wireless interface, etc.). The system also includes a CI controller 511 such as may incorporate the systems, devices, and components depicted and described with reference to FIGS. 1-4. The CI controller 511 includes program structures for generating training data to generate CI classification plugins/extensions as depicted and described with reference to FIGS. 1-4. The CI controller 511 further includes program structures for receiving and processing CI instance records from well interface units such as the depicted well interface units 502 and 504 to identify contaminant breakthrough zones as depicted and described with reference to FIGS. 1-4. To this end, the CI controller 511 may incorporate and/or utilize some or all of the system, devices, components, and data structures described in FIGS. 1-4.

Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for implementing well system flow control as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Example embodiments include the following:

Embodiment 1: A method comprising: determining a first flow control configuration including determining flow profiles for a plurality of zones each including at least one flow control device; generating contaminant intake classifications associated with one or more of the zones based on the first flow control configuration and a first contaminant level detected for a combined flow comprising inflow from the zones; and generating a second flow control configuration for the zones based on the contaminant intake classifications Embodiment 2: The method of Embodiment 1, further comprising implementing the second flow control configuration; and following said implementing the second flow control configuration, detecting a second contaminant level for the combined flow; and determining contaminant intake classifications for the zones based on the first flow control configuration, the second flow control configuration, and a difference in contaminant level from the first contaminant level to the second contaminant level.

Embodiment 3: The method of Embodiments 1-2, further comprising implementing the second flow control configuration including assigning flow rate modifications to one or more flow control devices within at least one of the zones and modifying flow resistivities of one or more flow control devices based on the assigned flow rate modifications.

Embodiment 4: The method of Embodiments 1-3, wherein the flow control devices include at least one inflow control device and at least one outflow control device, and wherein said modifying flow resistivities includes increasing a flow resistivity of the at least one outflow control device based on a contaminant intake classification of a zone including the at least one inflow control device.

Embodiment 5: The method of Embodiments 1-4, wherein said determining flow profiles for the plurality of zones includes generating inter-zone flow records that each, for each zone, associates a zone identifier (ID) with, a flow setting for at least one flow control device within the zone; and at least one other zone into which or from which fluid flows to or from the zone.

Embodiment 6: The method of Embodiments 1-5, wherein said determining a first flow control configuration comprises generating a flow control configuration record comprising inter-zone flow records for each of two or more of the zones.

Embodiment 7: The method of Embodiments 1-6, further comprising generating a contaminant intake instance record that associates the detected contaminant level with the flow control configuration record.

Embodiment 8: The method of Embodiments 1-7, further comprising: generating training records that each associate the zones with a contaminant intake value and respective contaminant intake classifications; and processing the training records by a supervised learning unit to generate a contaminant intake classifier.

Embodiment 9: The method of Embodiments 1-8, further comprising generating a contaminant intake instance record that associates the first detected contaminant level with inter-zone flow records for each of two or more of the zones, and wherein said determining contaminant intake classifications includes processing the contaminant intake instance record using the contaminant intake classifier to determine contaminant intake classifications for one or more of the zones.

Embodiment 10: An apparatus comprising: a processor; and a machine-readable medium having program code executable by the processor to cause the apparatus to, determine a first flow control configuration including determining flow profiles for a plurality of zones each including at least one flow control device; generate contaminant intake classifications associated with one or more of the zones based on the first flow control configuration and a first contaminant level detected for a combined flow comprising inflow from the zones; and generate a second flow control configuration for the zones based on the contaminant intake classifications.

Embodiment 11: The apparatus of Embodiment 10, wherein the program code further comprises program code executable by the processor to cause the apparatus to: implement the second flow control configuration; and follow said implementing the second flow control configuration, detect a second contaminant level for the combined flow; and determine contaminant intake classifications for the zones based on the first flow control configuration, the second flow control configuration, and a difference in contaminant level from the first contaminant level to the second contaminant level.

Embodiment 12: The apparatus of Embodiments 10-11, wherein the program code further comprises program code executable by the processor to cause the apparatus to implement the second flow control configuration including assigning flow rate modifications to one or more flow control devices within at least one of the zones and modifying flow resistivities of one or more flow control devices based on the assigned flow rate modifications.

Embodiment 13: The apparatus of Embodiments 10-12, wherein the program code executable by the processor to cause the apparatus to determine flow profiles for the plurality of zones includes program code executable by the processor to cause the apparatus to generate inter-zone flow records that each, for each zone, associates a zone identifier (ID) with, a flow setting for at least one flow control device within the zone; and at least one other zone into which or from which fluid flows to or from the zone.

Embodiment 14: The apparatus of Embodiments 10-13, wherein the program code executable by the processor to cause the apparatus to determine a first flow control configuration comprises program code executable by the processor to cause the apparatus to generate a flow control configuration record comprising inter-zone flow records for each of two or more of the zones.

Embodiment 15: The apparatus of Embodiments 10-14, wherein the program code further comprises program code executable by the processor to cause the apparatus to generate a contaminant intake instance record that associates the detected contaminant level with the flow control configuration record.

Embodiment 16: The apparatus of Embodiments 10-15, wherein the program code further comprises program code executable by the processor to cause the apparatus to: generate training records that each associate the zones with a contaminant intake value and respective contaminant intake classifications; and process the training records by a supervised learning unit to generate a contaminant intake classifier.

Embodiment 17: The apparatus of Embodiments 10-16, wherein the program code further comprises program code executable by the processor to cause the apparatus to generate a contaminant intake instance record that associates the first detected contaminant level with inter-zone flow records for each of two or more of the zones, and wherein said determining contaminant intake classifications includes processing the contaminant intake instance record using the contaminant intake classifier to determine contaminant intake classifications for one or more of the zones.

Embodiment 18: One or more non-transitory machine-readable media comprising program code to determine a first flow control configuration including determining flow profiles for a plurality of zones each including at least one flow control device; generate contaminant intake classifications associated with one or more of the zones based on the first flow control configuration and a first contaminant level detected for a combined flow comprising inflow from the zones; and generate a second flow control configuration for the zones based on the contaminant intake classifications.

Embodiment 19: The machine-readable media of Embodiment 18, further comprising program code to implement the second flow control configuration; and following said implementing the second flow control configuration, detect a second contaminant level for the combined flow; and determine contaminant intake classifications for the zones based on the first flow control configuration, the second flow control configuration, and a difference in contaminant level from the first contaminant level to the second contaminant level.

Embodiment 20: The machine-readable media of Embodiments 18-19, further comprising program code to implement the second flow control configuration including assigning flow rate modifications to one or more flow control devices within at least one of the zones and modifying flow resistivities of one or more flow control devices based on the assigned flow rate modifications.

What is claimed is:

1. A method for controlling flow rates within a well system, said method comprising:
    determining a first flow control configuration including determining flow profiles for a plurality of zones each including at least one flow control device, wherein the first flow control configuration comprises flow settings for two or more flow control devices at a time point;
    generating contaminant intake classifications associated with one or more of the plurality of zones based on the first flow control configuration and a first contaminant level detected for a combined flow measured via a single contaminant sensor at the surface comprising inflow from the plurality of zones, wherein the first contaminant level measures a water cut of produced fluid, and wherein generating each respective contaminant intake classification includes
        assigning the respective contaminant intake classification based on neighbors in a feature space and the first flow control configuration and the first contaminant level; and
    generating a second flow control configuration for the plurality of zones based on the contaminant intake classifications.

2. The method of claim 1, further comprising:
    implementing the second flow control configuration; and following said implementing the second flow control configuration,
  detecting a second contaminant level for the combined flow; and
  determining contaminant intake classifications for each of the plurality of zones based on the first flow control configuration, the second flow control configuration, and a difference in contaminant level from the first contaminant level to the second contaminant level.

3. The method of claim 1, further comprising implementing the second flow control configuration including assigning flow rate modifications to one or more flow control devices within at least one of the plurality of zones and modifying flow resistivities of the one or more flow control devices based on the assigned flow rate modifications.

4. The method of claim 3, wherein the one or more flow control devices include at least one inflow control device and at least one outflow control device, and wherein said modifying flow resistivities includes increasing a flow resistivity of the at least one outflow control device based on one of the contaminant intake classifications associated with one of the plurality of zones.

5. The method of claim 2, wherein said determining flow profiles for the plurality of zones includes generating inter-zone flow records, wherein each inter-zone flow record associates a zone identifier (ID) with a flow setting for at least one flow control device within a respective one of the plurality of zones and at least another respective one of the plurality of zones into which or from which fluid flows.

6. The method of claim 5, wherein said determining the first flow control configuration comprises generating a flow control configuration record comprising inter-zone flow records for each of two or more of the plurality of zones.

7. The method of claim 5, further comprising:
  generating training records, wherein each training record associates a respective zone of the plurality of zones with a respective contaminant intake value and a respective contaminant intake classification; and
  processing the training records by a supervised learning unit to generate a contaminant intake classifier.

8. The method of claim 7, further comprising generating a contaminant intake instance record that associates the first contaminant level with inter-zone flow records for each of two or more of the plurality of zones, and wherein said determining contaminant intake classifications includes processing the contaminant intake instance record using the contaminant intake classifier to determine a contaminant intake classification each of the plurality of zones.

9. The method of claim 1, further comprising providing power to the at least one flow control device via at least one turbine-powered generator driven, at least in part, by fluid flow in a production conduit.

10. An apparatus comprising:
  a processor; and
  a machine-readable medium having program code executable by the processor to cause the apparatus to,
  determine a first flow control configuration including determining flow profiles for a plurality of zones each including at least one flow control device, wherein the first flow control configuration comprises flow settings for two or more flow control devices at a time point;
  generate contaminant intake classifications associated with one or more of the plurality of zones based on the first flow control configuration and a first contaminant level detected for a combined flow measured via a single contaminant sensor at the surface comprising inflow from the plurality of zones, wherein the first contaminant level measures a water cut of produced fluid, and wherein the generation of each respective contaminant intake classification includes
    assignment of the respective contaminant intake classification based on neighbors in a feature space and the first flow control configuration and the first contaminant level; and
  generate a second flow control configuration for the plurality of zones based on the contaminant intake classifications.

11. The apparatus of claim 10, wherein the program code further comprises program code executable by the processor to cause the apparatus to:
  implement the second flow control configuration; and
  following said implementing the second flow control configuration,
    detect a second contaminant level for the combined flow; and
    determine contaminant intake classifications for each of the plurality of zones based on the first flow control configuration, the second flow control configuration, and a difference in contaminant level from the first contaminant level to the second contaminant level.

12. The apparatus of claim 10, wherein the program code further comprises program code executable by the processor to cause the apparatus to implement the second flow control configuration including assigning flow rate modifications to one or more flow control devices within at least one of the plurality of zones and modifying flow resistivities of the one or more flow control devices based on the assigned flow rate modifications.

13. The apparatus of claim 11, wherein the program code executable by the processor to cause the apparatus to determine flow profiles for the plurality of zones includes program code executable by the processor to cause the apparatus to generate inter-zone flow records, wherein each inter-zone flow record associates a zone identifier (ID) with a flow setting for at least one flow control device within a respective one of the plurality of zones, and at least another respective one of the plurality of zones into which or from which fluid flows.

14. The apparatus of claim 13, wherein the program code executable by the processor to cause the apparatus to determine the first flow control configuration comprises program code executable by the processor to cause the apparatus to generate a flow control configuration record comprising inter-zone flow records for each of two or more of the plurality of zones.

15. The apparatus of claim 13, wherein the program code further comprises program code executable by the processor to cause the apparatus to:
  generate training records, wherein each training record associates a respective zone of the plurality of zones with a respective contaminant intake value and a respective contaminant intake classification; and
  process the training records by a supervised learning unit to generate a contaminant intake classifier.

16. The apparatus of claim 15, wherein the program code further comprises program code executable by the processor to cause the apparatus to generate a contaminant intake instance record that associates the first contaminant level with inter-zone flow records for each of two or more of the plurality of zones, and wherein said determining contaminant intake classifications includes processing the contaminant intake instance record using the contaminant intake classifier to determine a contaminant intake classification for each of the plurality of zones.

17. The apparatus of claim 10, further comprising at least one turbine-powered generator driven, at least in part, by fluid flow in a production conduit to provide power to the at least one flow control device.

18. One or more non-transitory machine-readable media comprising program code executable by a processor for controlling flow rates within a well system, the program code executable by the processor to cause the processor to:
   determine a first flow control configuration including determining flow profiles for a plurality of zones each including at least one flow control device, wherein the first flow control configuration comprises flow settings for two or more flow control devices at a time point;
   generate contaminant intake classifications associated with one or more of the plurality of zones based on the first flow control configuration and a first contaminant level detected for a combined flow measured via a single contaminant sensor at the surface comprising inflow from the plurality of zones, wherein the first contaminant level measures a water cut of produced fluid, and wherein the generation of each respective contaminant intake classification includes
      assignment of the respective contaminant intake classification based on neighbors in a feature space and the first flow control configuration and the first contaminant level; and
   generate a second flow control configuration for the plurality of zones based on the contaminant intake classifications.

19. The machine-readable media of claim 18, wherein the program code further comprises program code to:
   implement the second flow control configuration; and
   following said implementing the second flow control configuration,
      detect a second contaminant level for the combined flow; and
      determine contaminant intake classifications for each of the plurality of zones based on the first flow control configuration, the second flow control configuration, and a difference in contaminant level from the first contaminant level to the second contaminant level.

20. The machine-readable media of claim 19, wherein the program code further comprises program code to implement the second flow control configuration including assigning flow rate modifications to one or more flow control devices within at least one of the plurality of zones and modifying flow resistivities of the one or more flow control devices based on the assigned flow rate modifications.

* * * * *